United States Patent
Hancock (10) Patent No.: US 10,011,267 B2
(45) Date of Patent: Jul. 3, 2018

(54) STALL-START METHOD AND APPARATUS FOR A PARALLEL HYBRID VEHICLE

(71) Applicant: Jaguar Land Rover Limited, Coventry (GB)

(72) Inventor: Matthew Hancock, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 229 days.

(21) Appl. No.: 14/894,582

(22) PCT Filed: May 27, 2014

(86) PCT No.: PCT/EP2014/060941
§ 371 (c)(1),
(2) Date: Nov. 30, 2015

(87) PCT Pub. No.: WO2014/195187
PCT Pub. Date: Dec. 11, 2014

(65) Prior Publication Data
US 2016/0121877 A1    May 5, 2016

(30) Foreign Application Priority Data
Jun. 4, 2013  (GB) .................................. 1309915.5

(51) Int. Cl.
*B60W 10/02* (2006.01)
*B60W 20/15* (2016.01)
(Continued)

(52) U.S. Cl.
CPC .............. *B60W 20/15* (2016.01); *B60K 6/48* (2013.01); *B60W 10/02* (2013.01); *B60W 10/06* (2013.01);
(Continued)

(58) Field of Classification Search
CPC ......... B60K 6/46; B60W 10/02; B60W 10/06; B60W 10/08; B60W 30/18027
See application file for complete search history.

(56) References Cited

U.S. PATENT DOCUMENTS 9,457,801 B2 * 10/2016 Onouchi .................. B60K 6/48
2004/0222639 A1  11/2004 Turner et al.
(Continued)

FOREIGN PATENT DOCUMENTS

CN        1944134 A      4/2007
CN      101301888 A     11/2008
(Continued)

OTHER PUBLICATIONS

Combined Search and Examination Report, GB 1309915.5, dated Dec. 3, 2013, 4 pages.
(Continued)

*Primary Examiner* — Stacey A Fluhart
(74) *Attorney, Agent, or Firm* — Myers Bigel, P.A.

(57) ABSTRACT

The application relates to a method for stall-starting a hybrid vehicle comprising a combustion engine (12), an electric machine (14), a transmission (16) and two clutches (20, 22). In a first stall phase torque output of the combustion engine (12) is increased and compensated by the electric machine (14) operating as a generator. In the second start phase the method comprises configuring the electric machine (14) not to operate as a generator, in particular to operate as a motor. A further independent claim is directed to a stall-start apparatus. This avoids overheating the clutches (20, 22) and battery depletion, while at the same time providing high acceleration.

17 Claims, 9 Drawing Sheets

(51) Int. Cl.
  *B60K 6/48* (2007.10)
  *B60W 10/06* (2006.01)
  *B60W 10/08* (2006.01)
  *B60W 20/00* (2016.01)
  *B60W 30/18* (2012.01)

(52) U.S. Cl.
  CPC .......... *B60W 10/08* (2013.01); *B60W 20/00* (2013.01); *B60W 30/18027* (2013.01); *B60K 2006/4825* (2013.01); *B60W 2710/021* (2013.01); *B60W 2710/083* (2013.01); *B60Y 2200/10* (2013.01); *B60Y 2300/18025* (2013.01); *B60Y 2300/42* (2013.01); *B60Y 2300/43* (2013.01); *B60Y 2300/64* (2013.01); *Y02T 10/6221* (2013.01); *Y02T 10/6252* (2013.01); *Y02T 10/6286* (2013.01); *Y02T 10/7258* (2013.01); *Y10S 903/93* (2013.01)

(56) References Cited

U.S. PATENT DOCUMENTS

| | | | |
|---|---|---|---|
| 2009/0264248 A1 | 10/2009 | Kozub et al. | |
| 2012/0022731 A1* | 1/2012 | Kuang | B60K 6/46 701/22 |
| 2012/0203417 A1* | 8/2012 | Matsui | B60K 6/48 701/22 |
| 2016/0313859 A1* | 10/2016 | Bamba | G06F 3/0488 |

FOREIGN PATENT DOCUMENTS

| | | | | |
|---|---|---|---|---|
| CN | 101357633 A | 2/2009 | | |
| EP | 1 772 301 A2 | 4/2007 | | |
| EP | 1 987 995 A1 | 11/2008 | | |
| EP | 2110289 A2 * | 10/2009 | ............... | B60K 6/28 |
| EP | 2 489 565 A1 | 8/2012 | | |
| JP | 1-178743 A | 7/1989 | | |
| JP | 8-182114 A | 7/1996 | | |
| JP | 2003-293816 A | 10/2003 | | |
| JP | 2006-137332 A | 6/2006 | | |
| JP | 2006-315488 A | 11/2006 | | |
| JP | 2009-030680 A | 2/2009 | | |
| JP | 2009-166670 A | 7/2009 | | |

OTHER PUBLICATIONS

Notification of Transmittal of the International Search Report and the Written Opinion of the International Searching Authority, or the Declaration, PCT/EP2014/060941, dated Oct. 9, 2014, 16 pages.
Office Action Summary corresponding to Japanese Appiication No. 2016-517236 dated Feb. 28, 2017, 6 pages.
First Office Action and English language translation, Chinese Patent Application No. 201480032207.5, dated Mar. 1, 2017 (17 pp.).

* cited by examiner

STALL-START METHOD AND APPARATUS FOR A PARALLEL HYBRID VEHICLE

RELATED APPLICATIONS

This application is a 35 U.S.C. § 371 national stage application of PCT Application No. PCT/EP2014/060941, filed on May 27, 2014, which claims priority from Great Britain Patent Application No. 1309915.5, filed on Jun. 4, 2013, the contents of which are incorporated herein by reference in their entireties. The above-referenced PCT International Application was published in the English language as International Publication No. WO 2014/195187 on Dec. 11, 2014.

FIELD OF THE INVENTION

The present disclosure relates to a stall-start method and apparatus for a hybrid vehicle. Aspects of the invention relate to a method, to an apparatus and to a vehicle.

BACKGROUND

Stall-start methods are used to provide high levels of torque for launching a vehicle. This is useful in achieving the shortest possible 0-60 mph or 0-100 kph times for a predetermined engine configuration. In conventional vehicles having a combustion engine, stall-start methods are initiated by application of the brakes of the vehicle while bringing the engine of the vehicle up to a speed, by pressing the accelerator pedal, where the torque of the engine is increased, in a stall phase. Once the engine is producing high torque, the brakes are released and the vehicle accelerates, in a start phase, under higher torque than would be possible from a standard start condition.

During the stall phase, the engine output rotates while the vehicle wheels remain stationary. A torque converter is often used to permit slip, in a slip condition, between the engine and the wheels. Torque converters have a thermal capacity that is reached in the slip condition after a period of time whose length is dependent on, among other factors, the engine output speed and output torque. Therefore the stall phase can only be maintained until thermal capacity is reached. Torque converters store torque produced by the engine during the stall phase. In the start phase, the torque converter transfers power from the rotating engine output to the wheels as well as the power stored in the torque converter, thus resulting in an amplified torque.

Hybrid vehicles generally feature an electric machine disposed between a combustion engine and the wheels of the vehicle. Commonly, a clutch is positioned between the electric machine and the wheels and takes the place of the torque converter described above. Clutches generally have a lower thermal and torque capacity than torque converters, which are sometimes used in hybrid vehicles but clutches are preferred because of packaging limitations in the hybrid vehicle due to the presence of the electric machine as well as the combustion engine.

The reduced thermal and torque capacity of a clutch compared to that of a torque converter means that the stall phase cannot be held for as long in hybrid vehicles using a clutch as in conventional vehicles using a torque converter, because the clutch would overheat. In turn this means that not as much engine torque can be built up in the stall phase and then transferred to the wheels in the start phase. Furthermore, the clutch does not store torque in the same way as the torque converter such that there is no torque amplification in the start phase.

It is an object of the present invention to at least mitigate one or more of the aforementioned problems.

SUMMARY OF THE INVENTION

According to a first aspect of the present invention there is provided a method for stall-starting a hybrid vehicle, the hybrid vehicle comprising a combustion engine connected to an electric machine connected to a first clutch connected to a drive load, the combustion engine having a first output rotation direction, the method comprising a first stall phase and a second start phase, wherein, in the first stall phase, the method comprises: configuring the first clutch to operate in a non-engaged condition; and configuring the electric machine to operate as a generator to apply torque in a second rotation direction opposing the first rotation direction; and wherein in the second start phase the method comprises: configuring the first clutch to operate in an engaged condition to drive the drive load; and configuring the electric machine to cease operating as a generator.

In an embodiment the second start phase of the method comprises the step of: configuring the electric machine to operate as a motor to apply torque in the first direction. This has the advantage that additional torque to the engine torque can be supplied by the electric motor.

The hybrid vehicle may comprise a transmission and the first clutch is positioned between the electric machine and the transmission.

Embodiments of the invention therefore provide the advantage of being able to increase the torque output of the engine above that which the first clutch would otherwise be capable of handling when it is permitted to slip.

In an embodiment, the hybrid vehicle comprises a second clutch positioned between the combustion engine and the electric machine, and wherein in the first stall phase the method comprises configuring the second clutch to operate in an engaged configuration to transfer torque from the combustion engine to the electric machine, optionally with substantially no torque slip. In the second start phase, the method may comprise configuring the second clutch to operate in a non-engaged configuration for a first period of time, wherein the first period of time begins substantially at the beginning of the second start phase. This has the advantage of permitting torque slip between the combustion engine and the electric machine. The second clutch may be configured to operate in an engaged configuration for a second period of time, wherein the second period of time is after the first period of time.

In the second start phase, the second clutch may be configured to operate in a non-engaged configuration for a first period of time and is configured to operate in an engaged configuration for a second period of time, wherein the send period of time is after the first and the first period of time is substantially at the beginning of the second start phase.

According to another aspect of the invention, there is provided a stall-start control apparatus for a hybrid vehicle, the hybrid vehicle comprising a combustion engine having an output connected to an electric machine connected to a first clutch connected to a drive load, the combustion engine having a first output rotation direction, the stall-start control apparatus comprising a controller operable in a first stall state and a second start state, wherein: in the first stall state, the controller configures: the electric machine to operate as a generator to apply torque in a second rotation direction opposing the first rotation direction; and the first clutch to operate in a non-engaged configuration; and in the second start state, the controller configures: the electric machine to cease operating as a generator; and configures the first clutch to operate in an engaged configuration to drive the drive load.

In the second start state the controller may configure the electric machine of the hybrid vehicle to operate as a motor.

In another embodiment, the hybrid vehicle comprises a transmission and the first clutch is positioned between the electric machine and the transmission.

The hybrid vehicle may comprise a second clutch positioned between the combustion engine and the electric machine, wherein the controller is adapted to control the second clutch, wherein in the first stall state, the controller configures the second clutch to operate in an engaged condition. Optionally, in the second start state, the controller configures the second clutch to permit torque slip between the combustion engine and the electric machine for a first period of time, wherein the first period of time begins substantially at entry into the second start state. The second clutch may be configured to operate in an engaged configuration for a second period of time, wherein the second period of time is after the first period of time.

In an embodiment of the invention, the stall-start apparatus comprises a human-machine interface arranged to operate the controller of the stall-start control apparatus. The human-machine interface may comprise a starting means arranged to operate the controller to operate in the first stall state. The starting means may be arranged in the first stall state to operate the controller to operate in the second start state. The starting means may comprise a button.

In an embodiment of the invention, the stall-start apparatus comprises an information means and a status monitor, wherein the status monitor is arranged to monitor the status of the first clutch in the first stall state and control the information means in dependence on the status of the first clutch.

In an embodiment of the invention, the stall-start apparatus comprises a configurable countdown timer arranged to operate the controller in the first stall state to end the first stall state after a predetermined period of time.

According to another aspect of the present invention, there is provided a hybrid vehicle comprising a stall-start control apparatus having the features of the stall-start control apparatus as described above in relation to the second aspect of the present invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE FIGURES

Embodiments of the invention will now be described, by way of example only, with reference to the accompanying drawings, in which.

DETAILED DESCRIPTION

Detailed descriptions of specific embodiments of the stall-start method and apparatus therefore, and a hybrid vehicle, of the present invention are disclosed herein. It will be understood that the disclosed embodiments are merely examples of the way in which certain aspects of the invention can be implemented and do not represent an exhaustive list of all of the ways the invention may be embodied. Indeed, it will be understood that the stall-start method and apparatus therefore, and the hybrid vehicle, described herein may be embodied in various and alternative forms. The Figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
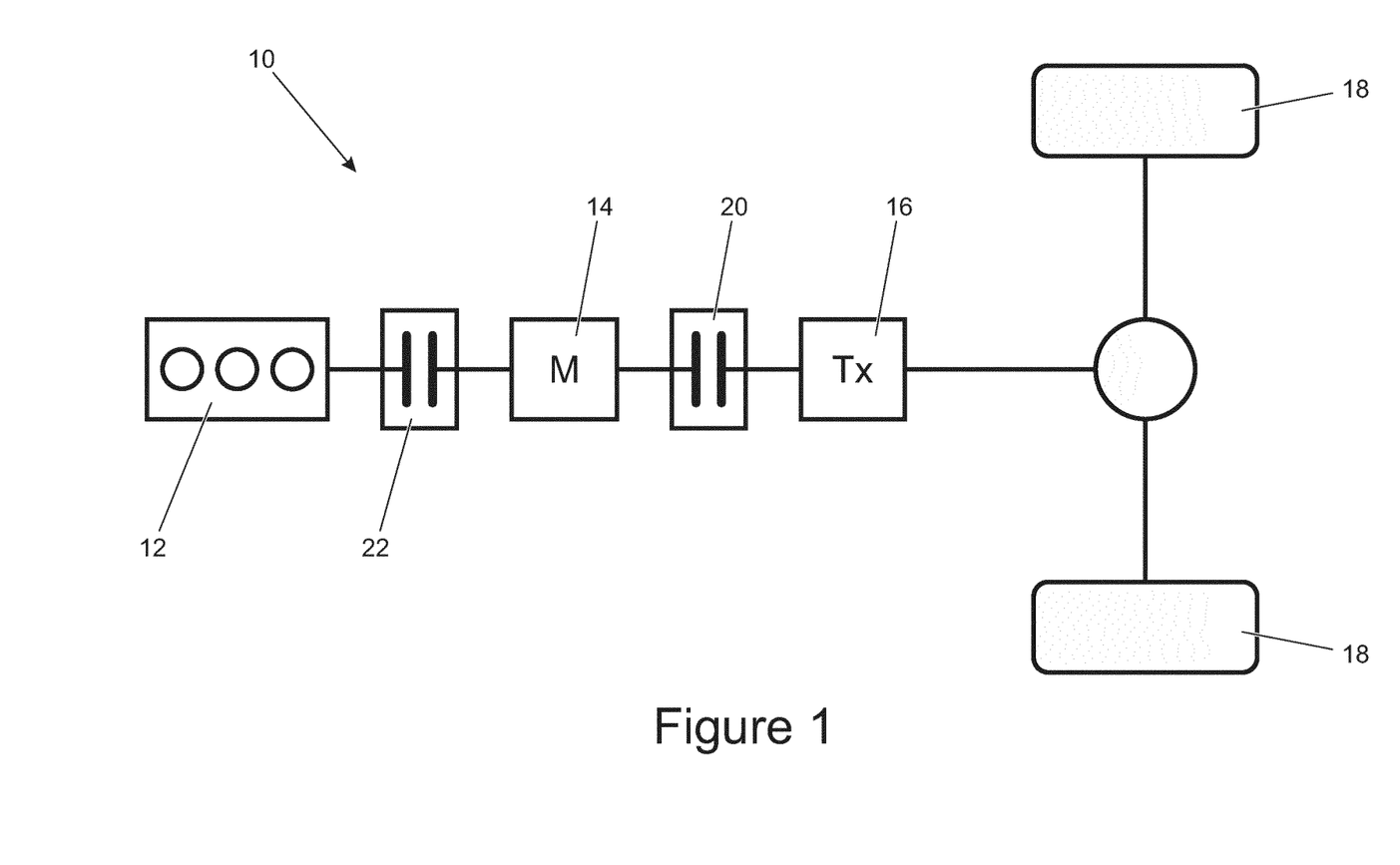
FIG. 1 shows a hybrid vehicle as known in the art.

FIG. 1 shows a hybrid vehicle 10 as known in the art. The hybrid vehicle comprises a combustion engine 12 and an electric machine 14, both of which can apply torque to the hybrid vehicle transmission 16, which is in turn passed to the wheels 18. A first clutch, or B-clutch, 20 is positioned between the electric machine 14 and the transmission 16 to enable transfer and slip of the torque produced by the electric machine 14 and/or the combustion engine 12. A second clutch, or K0 clutch, 22 is positioned between the combustion engine 12 and the electric motor 14 to enable transfer and slip of the torque produced by the combustion engine 12 to the electric machine and vice versa. Each clutch is configurable in an engaged configuration whereby torque is transferred by the clutch and in a non-engaged configuration wherein the torque transfer is reduced. The non-engaged configuration comprises a disengaged configuration whereby sufficiently no torque is transferred and a slip condition whereby a percentage of torque is transferred but the. Therefore, by non-engaged it should be understood that the clutch is not fully engaged but may be partially engaged or in any other state that is not fully engaged. The first clutch 20 may instead be a torque converter but packaging limitations in hybrid vehicles usually determines that the first clutch 20 is a clutch.

Figure 2:
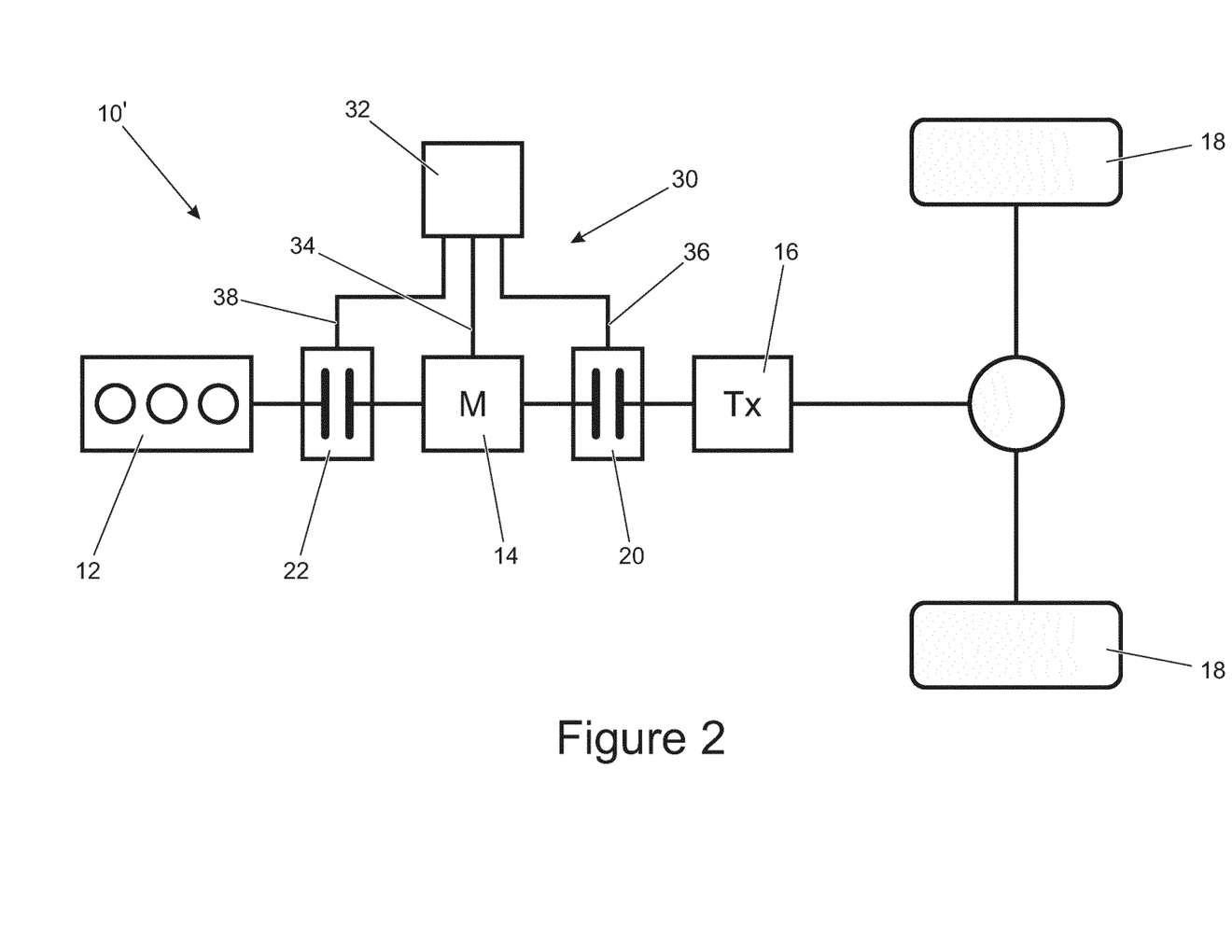
FIG. 2 shows a hybrid vehicle according to an embodiment of the present invention.

FIG. 2 shows a hybrid vehicle 10' according to an embodiment of the present invention. As shown, the hybrid vehicle 10' comprises the features of the hybrid vehicle 10 described above in relation to FIG. 1. Additionally, the hybrid vehicle 10' according to an embodiment of the present invention comprises a stall-start control apparatus 30 having a stall-start controller 32. The stall-start controller may be a computer that controls the electric machine 14 via an electronic coupling 34. The computer may have power electronics and may control the electric machine 14 using three-phase motor control. Optionally, the stall-start controller controls the first clutch 20 via an electronic coupling 36, and may control the second clutch 22 via an electronic coupling 38. It should be appreciated that the electronic couplings 34, 36, 38 are not limited to physical connections and may be made wirelessly or via other means, and thus the electronic couplings do not limit the scope of this invention. It should be understood that the controller is not limited to a single means. Rather, the controller could comprise several means being so linked as to act as a stall-start controller for the purposes of the present invention. Application of the controller is best described by reference to its use in a method of stall-starting a hybrid vehicle according to embodiments of the present invention.

Figure 3:
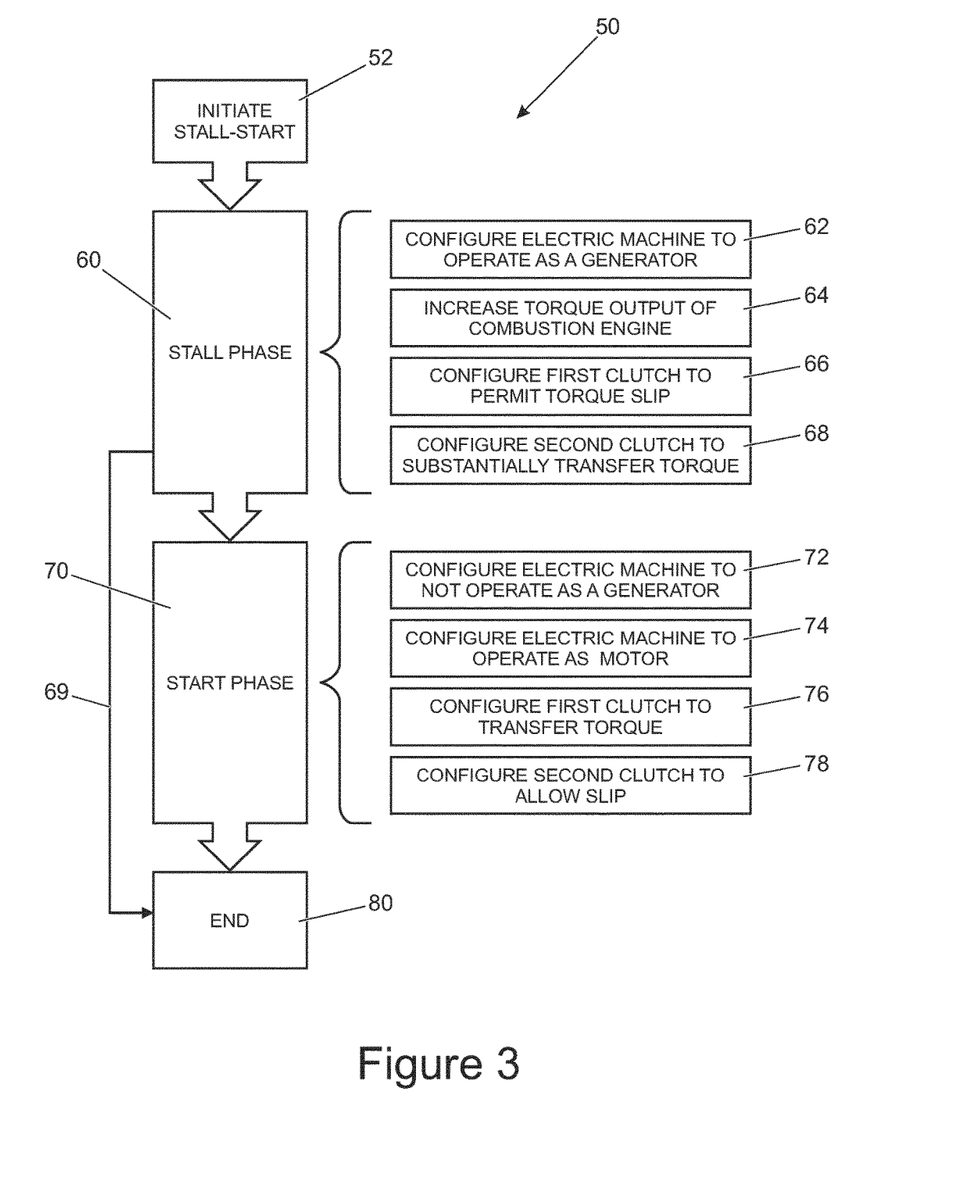
FIG. 3 shows a flow diagram of a stall-start method according to an embodiment of the present invention.

FIG. 3 shows a method 50 for stall-starting a hybrid vehicle such as that described in relation to FIG. 2. Once initiated 52, the method comprises two phases: a first stall phase 60 and a second start phase 70. The method may be initiated at 52 by detection that a driver of the hybrid vehicle wants to perform a stall-start. This could be, for example, through detecting that the driver has applied and sustainably held the brakes of the hybrid vehicle while applying the accelerator. Following detection of driver desire to perform a stall-start, the first stall phase begins. It should be noted that other methods of initiation are within the scope of this invention. For example, the stall-start method may be initiated by a user-controller button or trigger that instructs the stall-start controller to perform a stall-start. These examples are discussed further below.

In the stall phase 60, the method comprises configuring the electric machine to operate as a generator 62. This has the effect that the electric machine supplies negative torque with respect to the torque generated by the combustion engine when the engine accelerator/throttle is applied. During the start phase, the method comprises configuring the first clutch 20 (see FIG. 2) to operate in a non-engaged, slip condition 66. The slip condition is achieved in this example by partially disengaging the clutch from its engaged/locked configuration such that the downstream, e.g. wheel-side, portion of the clutch is braked by the brakes of the vehicle while the upstream, e.g. engine-side, portion of the clutch is rotated by the combustion engine and/or electric machine. This has the effect of allowing the combustion engine rotational output to increase while the wheels 18 (see FIG. 2) of the hybrid vehicle remain stationary. The slip condition provides resistance to engine speed and so higher torque is generated as higher engine speeds are reached. Therefore, during the stall phase the torque output of the combustion engine is increased 64 as the rotational speed of the engine increases during application of the accelerator. The application of the accelerator may be performed by the driver and/or the stall-start controller 32 as explained further below.

Further optionally during the start phase, the method comprises configuring the second clutch to operate in an engaged configuration to substantially transfer torque 68 from the combustion engine output to the electric machine input/output. This has the effect that the second clutch 22 does not slip and as a result does not heat up beyond its thermal capacity. This is advantageous because the second clutch 22 is generally a small clutch due to packaging limitations, wherein a small clutch usually has a lower thermal capacity than a relatively bigger clutch. It is, however, within the scope of the invention to permit some slip of the second clutch to even the thermal load between the first and second clutches.

On detection of an end to the stall phase, the start phase begins. The end of the stall phase may be detected using several means. For example, the driver may release the brakes while continuing to hold the accelerator, thereby indicating his desire to accelerate the hybrid vehicle and thus enter the start phase 70 of the method 50. Alternatively, for example, the controller 32 (see FIG. 2) may detect that the first and/or second clutches are, or are close to, overheating. In this approach, the stall phase is ended and the method 50 moves directly 69 to an end 80, thus bypassing the start phase 70. This is discussed further below. The stall phase may also be ended if driver releases the accelerator whilst holding the brakes on, thus indicating that the driver no longer wishes to perform the stall-start. Other methods of ending the stall phase are discussed below.

Following entry into the start phase, the method comprises configuring the electric machine to cease operating as a generator 72. This has the effect of immediately reducing the negative torque issued by the generator at 62 in the stall phase. In an embodiment of the method 50 during the start phase, the method comprises configuring the electric machine to operate as a motor 74. In this condition, the motor supplies torque in the same rotational direction as that supplied by the combustion engine. During the start phase, the method comprises configuring the first clutch to operate in an engaged configuration to transfer torque 76 and/or configuring the second clutch operate in a non-engaged, slip, condition to allow slip 78. The advantageous effects of this are discussed further below. After the start phase, the stall-start method reaches the end 80 where the hybrid vehicle may continue to move as determined by the driver. The start phase may end when the first and/or second clutches are engaged. Alternatively, the start phase may end when a power supply powering the electric machine operating as a motor is substantially depleted. In another example, the start phase may end after a predetermined period of time or when a predetermined vehicle speed has been reached.

Figure 4:
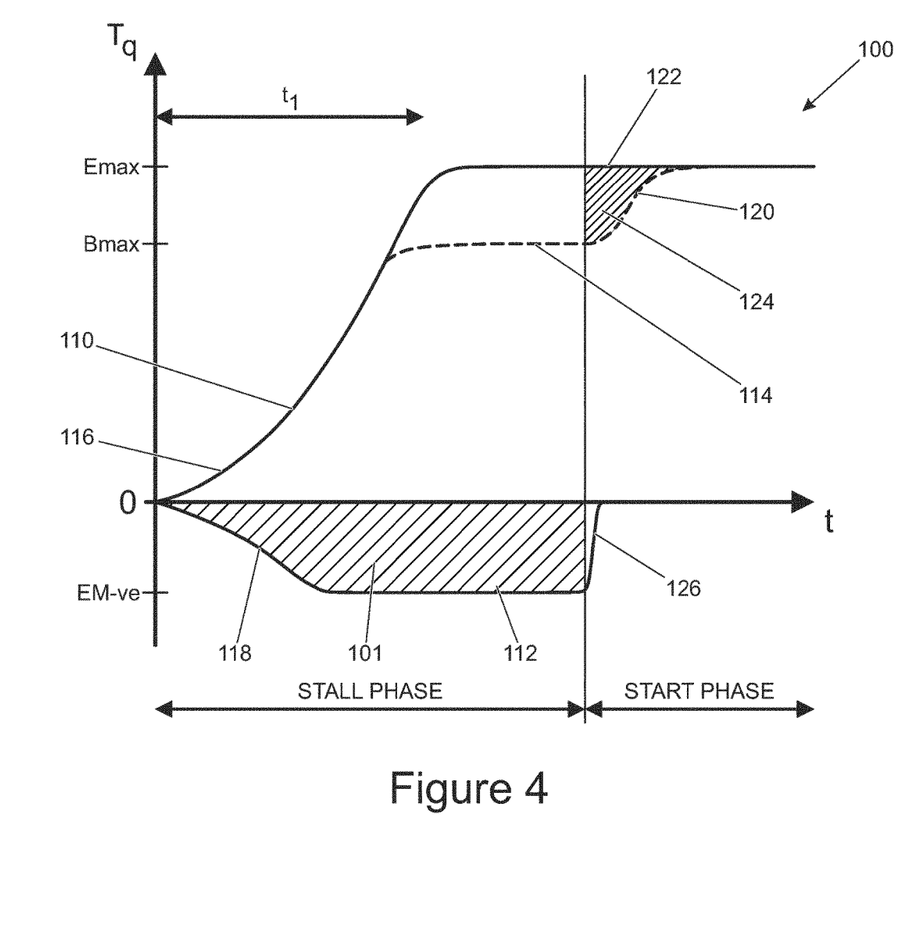
FIG. 4 shows a torque curve during a stall-start method according to an embodiment of the present invention.

FIG. 4 schematically shows the torque curves 100 during a stall-start method according to an embodiment of the present invention. The torque curves depict the torque, Tq, over time, t, for the engine torque 110 and the electric machine torque 112. For explanation purposes only, a dashed line 114 illustrates the engine torque in a condition where a method according to an embodiment of the present invention is not used.

As schematically shown in FIG. 4, in a method according to an embodiment of the present invention, the engine torque 110 is increased at the beginning 116 of the start phase. Simultaneously, a negative torque 118 is applied by the electric machine acting as a generator and reaches a peak negative torque at EM−ve. The negative torque of the electric machine permits the engine torque 110 to reach the maximum value possible, Emax. This is because the combination of the positive engine torque and the negative electric machine torque results in an overall torque value that is less than that permitted by the first clutch 20 (see FIG. 2), indicated by Bmax, when the first clutch is configured to operate in the non-engaged, slip, condition. This is in contrast with the dashed line 114 where the engine torque is limited at the Bmax value to prevent damage to the first clutch. Therefore, the present invention allows the build-up of torque above the first clutch capability. Bmax is determined by the slip capacity of the first clutch. Bmax depends on several factors and is chosen to prevent damage to the clutch over the period of time where the stall condition is held. It follows that to permit longer stall periods, Bmax is reduced so that the clutch does not overheat. In an embodiment of the present invention, Bmax is chosen as 550 Nm and can be held for approximately 3 seconds. EM−ve supplies 100 Nm of torque in an opposite direction to the torque supplied by the engine. Therefore, the engine is able to supply 650 Nm of torque without damaging the first clutch 20 (see FIG. 2). The time taken to reach Emax is shown by $t_1$, which is preferably shorter than the time period for which the stall condition can be held, thus allowing the engine to reach Emax in the stall phase.

The built-up torque is released on entry into the start phase. At this point, the first clutch engages and in doing so is able to transmit more torque. As mentioned, the dashed line 114 represents a method which is not used, where the engine torque has to increase at 120 to reach the maximum engine torque, Emax. However, in the present invention, the torque is already at Emax at 122 and thus is able to transfer more torque as the first clutch engages. Therefore there is a torque gain from the region indicated at 124. On entry into the start phase, the electric machine is configured to not act as a generator. The reconfiguration from the configuration of the electric machine as a generator at 112 is sufficiently instantaneous as shown at 126. This enables the full available torque to be supplied to the first clutch as it is configured to engage.

Figure 5:
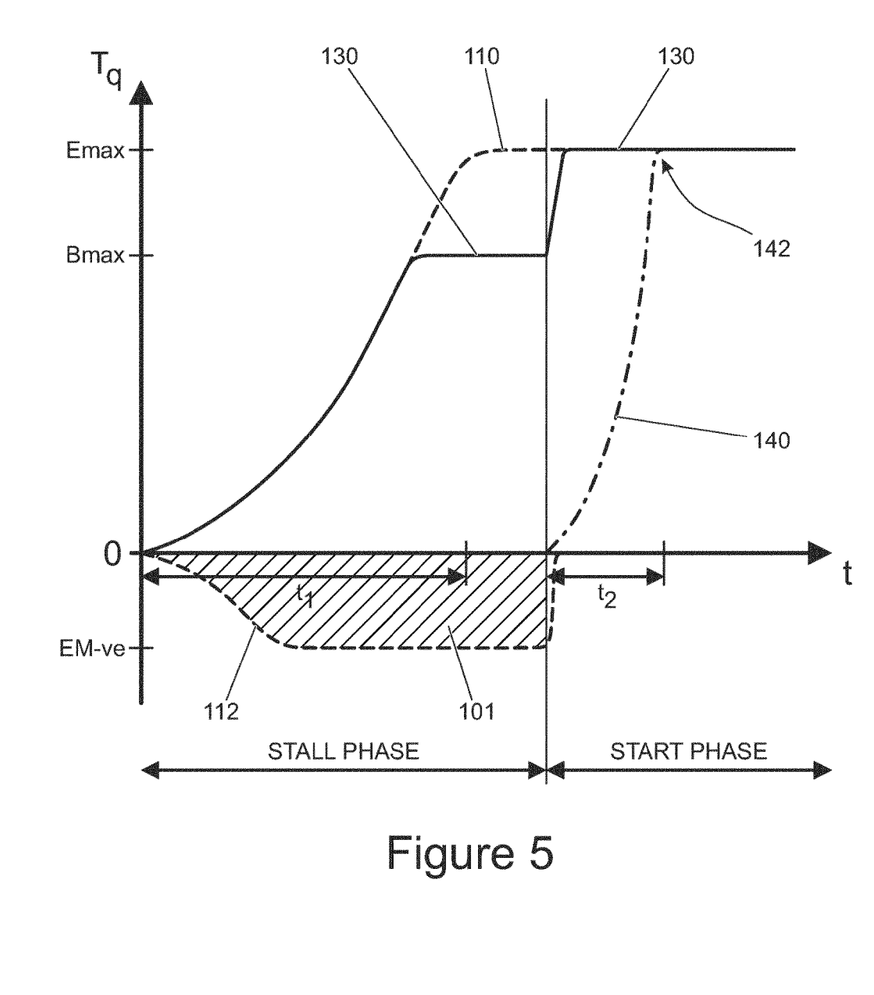
FIG. 5 shows a torque curve during a stall-start method according to an embodiment of the present invention.

Turning to FIG. 5, the torque presented to the first clutch is shown by 130 varying over time, and is derived by a combination of the engine torque 110 and the electric machine torque 112 as discussed in relation to FIG. 4. FIG. 5 further shows the wheel torque 140. The wheel torque is zero during the stall phase where the vehicle brakes are applied and increases in the start-phase as torque is transferred by the first clutch 20 (see FIG. 2) to the transmission 16 (see FIG. 2) and to the wheels. At point 142, the clutch is engaged and is able to transfer all of the available torque 130 to the transmission and in turn to the wheels. The time period, $t_2$, taken for the clutch to engage is dependent on the torque presented to the first clutch from the drivetrain upstream of the first clutch, and the speed of the input to the clutch. The time period $t_2$ could be, for example, of the order of one second. It should be noted that $t_2$ is shorter than $t_1$ and thus the torque available to accelerate the vehicle using the stall-start method is greater than the torque available in a standard condition where a stall-start method is not used.

Figure 6:
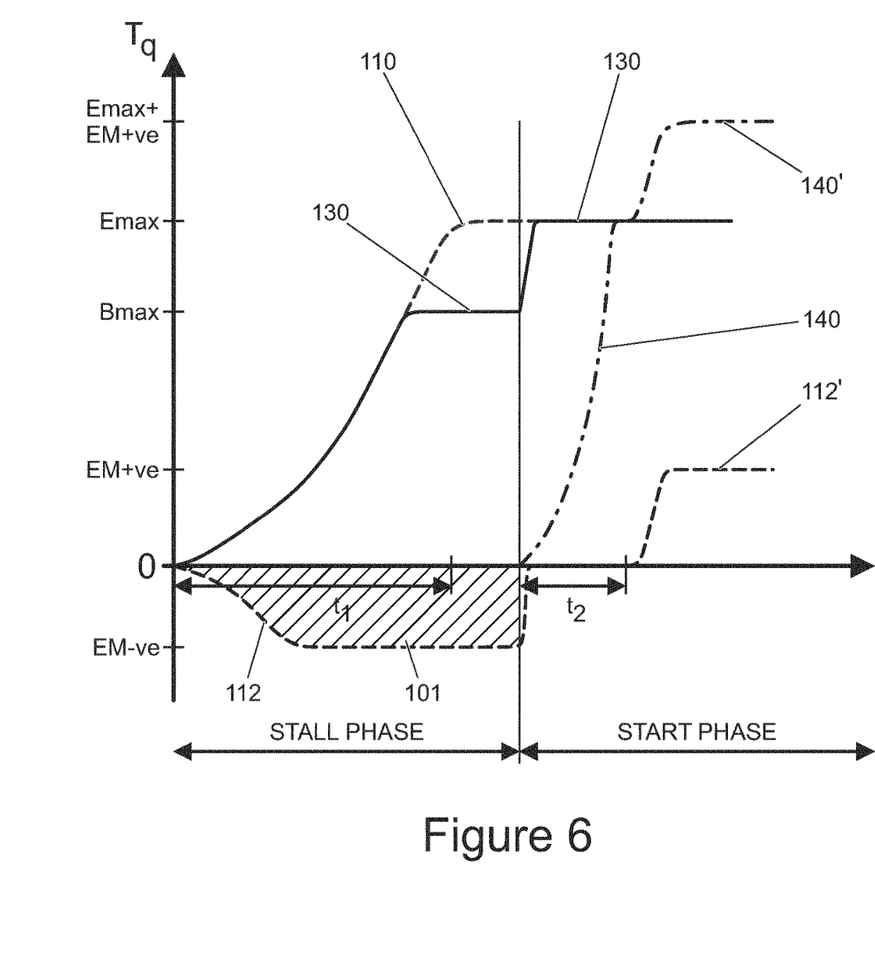
FIG. 6 shows a torque curve during a stall-start method according to an embodiment of the present invention.

FIG. 6 shows a further embodiment of the present invention wherein the wheel torque 140 is shown. In this embodiment, after the time $t_2$, the electric machine is configured to operate as a motor at 112' to supply a positive torque (i.e. in the same direction as the engine), EM+ve, to the transmission so that the wheel torque available to accelerate the vehicle is increased above Emax at 140'. The EM+ve torque is supplied after the time period $t_2$ such that the first clutch 20 (see FIG. 2) has engaged before additional torque is provided that might otherwise cause the time period $t_2$ to extend. Furthermore, the EM+ve torque supplied to the Emax torque would increase the torque transferred to the clutch beyond the torque permitted during the slip condition.

Figure 7:
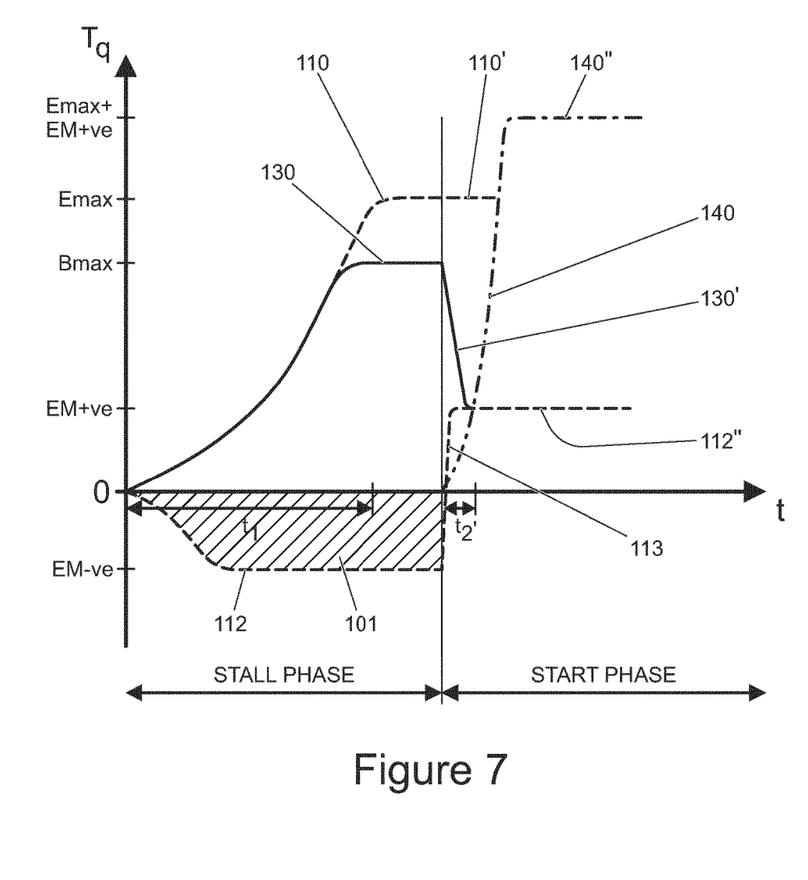
FIG. 7 shows a torque curve during a stall-start method according to an embodiment of the present invention.

FIG. 7 shows an alternative embodiment of the present invention to that shown in FIG. 6. In the embodiment of FIG. 7, the time $t_2'$ is shorter than $t_2$ in FIG. 6. $t_2'$ is achieved by permitting the second clutch 22 (see FIG. 2) to slip on entry into the start phase. This has the effect of reducing the torque, and drivetrain speed, presented to the first clutch at the beginning of the start phase, thus allowing the first clutch to engage in a quicker time than in the example of FIG. 6. As shown in FIG. 7, the torque presented 130 to the first clutch therefore decreases along a path schematically illustrated by the line 130' as the second clutch permits slip in the slip condition. Torque is however, also delivered to the first clutch by the electric machine configured as a motor. The reconfiguration of the electric machine from its behaviour as a generator at 112 to its behaviour as a motor at 112" is near instantaneous at 113. This embodiment is particularly advantageous because the electric motor delivers high torque at low speeds meaning that the first clutch engages quickly and high torque levels are transferred to the wheels in a short time frame as indicated by the wheel torque 140 shown in FIG. 7.

After the time period $t_2'$, the first clutch is in the engaged configuration and the second clutch is controlled to engage, whereby all of the available engine torque (Emax+EM+ve at 140") is transferred to the first clutch. The period $t_2'$ where the second clutch is permitted to slip does not lead to damage of the second clutch. This embodiment therefore has the advantage that the maximum torque available on entry into the start phase (Emax+EM+ve) is quickly transferred to the transmission and may be used to accelerate the vehicle.

In each of the foregoing examples where the electric machine 14 is configured to operate as a motor, it should be understood that the torque supplied by the motor appears to provide an amplified torque to that which is available from the engine 12.

Figure 8:
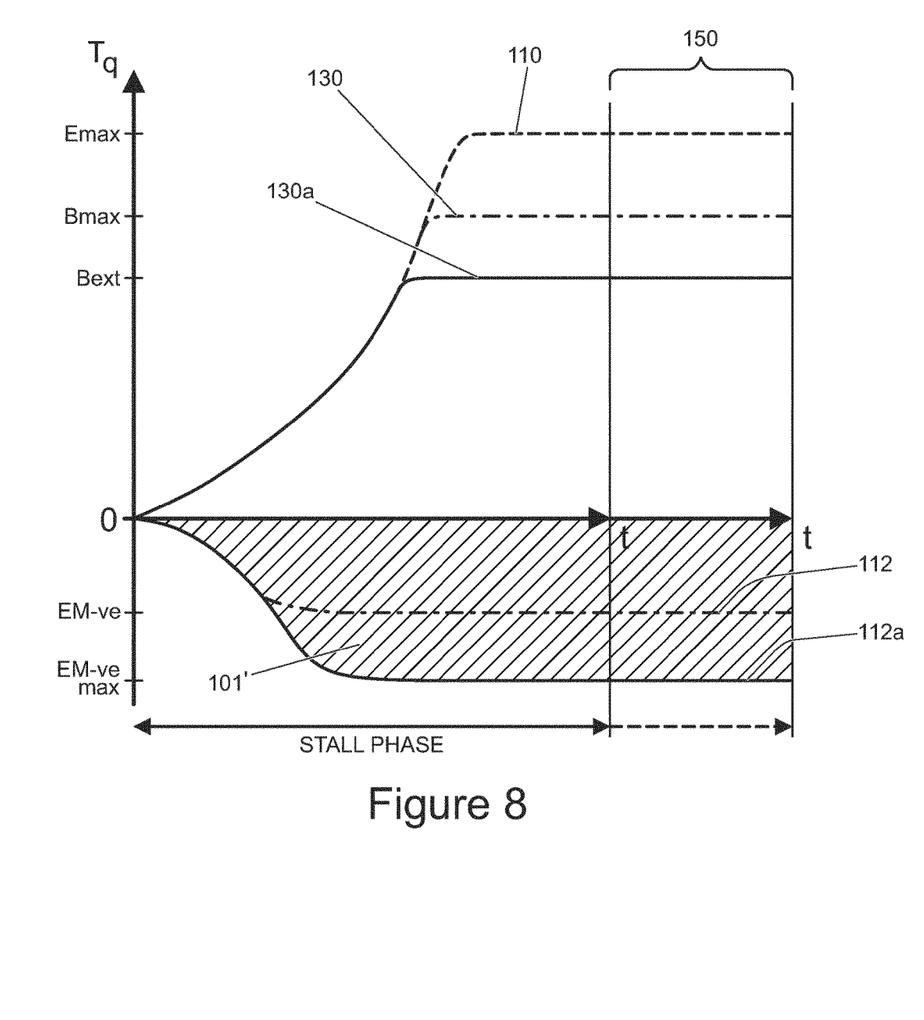
FIG. 8 shows a torque curve during a stall-start method according to an embodiment of the present invention.

FIG. 8 shows a torque curve during the stall-phase according to any of the foregoing embodiments. However, here additional negative torque is provided by the electric machine to further compensate for the torque provided by the engine. In particular, the negative torque provided by the electric machine is increased from 112 as previously discussed to 112a as shown. This has the effect of reducing the torque presented to the first clutch from 130 as previously discussed to 130a as shown. This may also be described as reducing the torque presented to the clutch from Bmax to Bext. Such a reduction leads to the ability to hold the engine at Emax for a longer period of time as shown by the region 150. This is advantageous because, for example, the driver may wish to hold the vehicle in the stall state for a long period of time, or may need to hold the vehicle in the stall state for a longer period of time due to their reaction times or other limiting factors. Therefore the controller may be configured to provide for a condition best suited to the driver.

Throughout the embodiments described above, the start phase is also effective in generating power that is consumed during stall-starts. For the period of the stall phase where the electric machine acts as a generator, electric power is generated 101, 101' see FIGS. 4 to 8. The power is stored in batteries used to supply electric power to the electric machine when it is used as a motor. This has the advantage that the significant power usage during acceleration using the electric machine as a motor is offset by the power generation during the stall-phase. FIGS. 4 to 7 illustrate the region 101 where electrical power is generated during the stall phase. This is advantageous because the driver of the vehicle may repeat the stall-start several times in close proximity whereas in systems where electrical power is not generated during the stall phase, but is used during the start phase, the driver may only be able to perform a stall-start one or two times before the electric motor can no longer be used to accelerate the vehicle. In the example of FIG. 8, the power generation during the stall phase is increased through the higher negative torque that is applied.

As previously mentioned in relation to FIG. 3, the stall-start method is ended either after the start phase has finished or when the stall phase is terminated. As described, termination may be due to the drivers desire to stop the stall-start.

Alternatively, termination may be automated because of fault detection such as overheating of the clutch. The controller may be used to detect faults via the connection means 34, 36, 38 (see FIG. 2) or otherwise, and may be configured to terminate the stall phase on detection of the fault.

Figure 9:
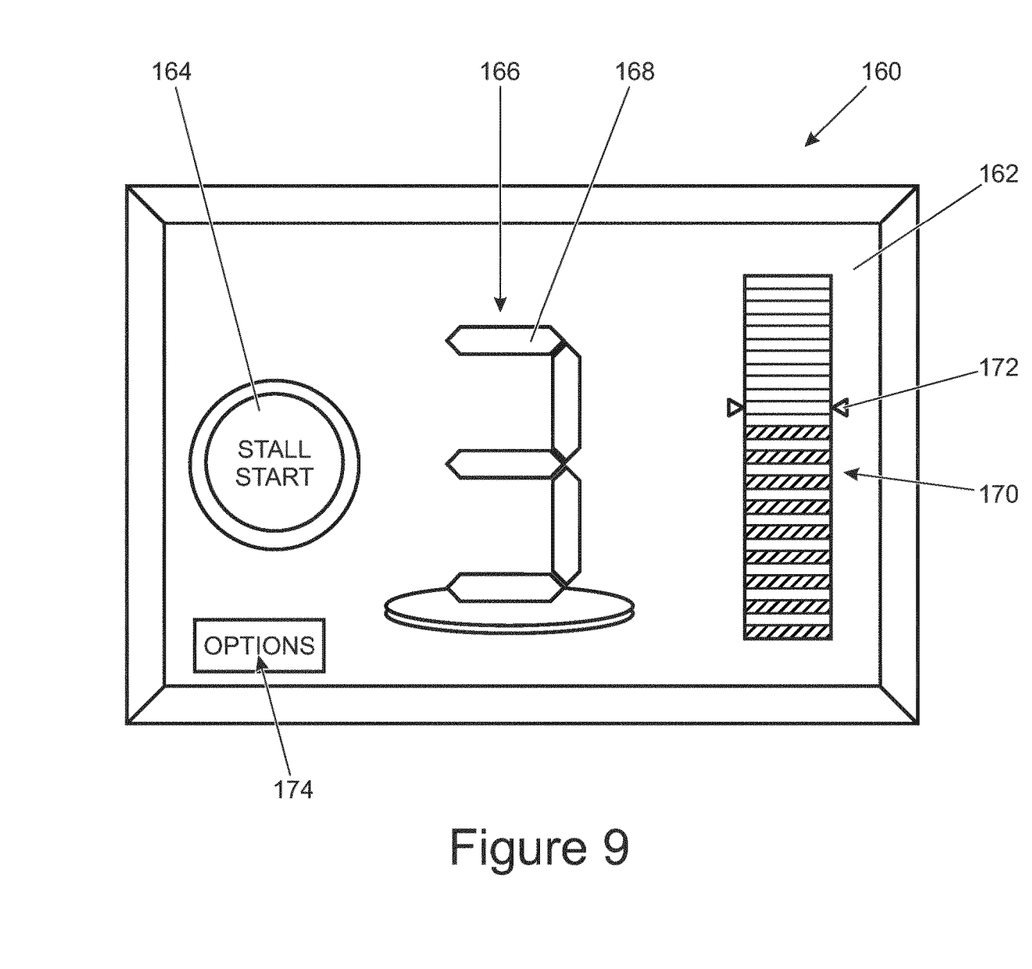
FIG. 9 shows an HMI according to an embodiment of the present invention.

FIG. 9 shows an example human-machine interface (HMI) 160 of an embodiment of the present invention. The interface may comprise a touchscreen display 162 or similar, however the choice of interface does not limit scope of the invention. The HMI 160 provides for optional features of the current invention, which are depicted on the HMI 160 illustrated in FIG. 9, and may be used individually or in combination. The HMI may, in an example, provide a user-controllable stall-start button, or starting means, 164 to initiate the stall-start method. In embodiments where the display is active, such as a touchscreen interface, the stall-start button 164 may, before initiation of the stall-start method read "STALL START", thereby indicating to the driver of the vehicle that the stall-start button 164 is for stall starting the vehicle. On pressing the stall-start button 164, the stall start method may begin and the stall-start button 164 text be updated to read "CANCEL STALL START", thereby indicating to the driver of the vehicle that the stall-start button 164 is now useable to cancel the stall-start method. After pressing the stall-start button, the stall-start method may be initialised. The controller then may then control the first and second clutch 20, 22 and the electric machine 14 to carry out the stall-start method.

The controller may also be capable of arming the stall-start method through controlling the engine speed and torque such that the stall condition is maintained by the controller without driver input until driver desire to enter the start phase is detected. The stall condition may be held for a variable amount of time depending on the level that the stall condition is held. Holding the stall condition may be performed by electronically applying the brakes while increasing the engine speed. The controller may receive information from sensors on the clutches that indicate the status of the clutch such that the engine speed is controlled to avoid the clutches overheating during the slip configuration. Through such, the controller may alter the engine speed so that the stall condition is held without causing damage to the clutches. For example, during the stall condition, the engine speed may be increased at or near to the point at which the maximum slip condition torque is supplied. If the stall condition is held sufficiently long enough for the clutch to overheat, the controller decreases the engine speed to maintain the stall condition while protecting the clutches. Driver desired entry to the start phase may then be determined by detecting application of the accelerator pedal or equivalent. Through this embodiment, the vehicle is armed to perform a stall-start by the driver pressing the stall-start button. It is within the scope of the invention, however, for the vehicle to be armed in other ways.

After pressing the stall-start button, and otherwise, the HMI 160 may display a countdown timer 166 to illustrate the time until the stall start method enters the start phase. This time may be predefined and programmable by the user through the HMI. At the end of the countdown, the vehicle will optionally automatically begin to accelerate under the start phase. In other embodiments, the vehicle will not enter the start phase unless the driver depresses the accelerator pedal. Therefore, in some embodiments, the countdown timer may illustrate the time remaining for the driver to depress the accelerator pedal and thus enter the start phase. Indeed, if and when the driver does depress the accelerator pedal, the start phase may be entered. Accordingly, the HMI may be immediately updated to inform the driver that the stall start method is in the start phase. This can be, for example, through the countdown timer 166 disappearing or the time text 168 being replaced by the word "GO".

The time remaining may be predetermined to avoid overheating of the clutch. For example, if the clutch installed in the vehicle has a thermal capacity in the slip condition of 3 seconds, then the countdown timer may count down from 3, through 2 and 1. In another example embodiment, a clutch temperature meter, or other information means, 170 may also or otherwise be provided on the HMI to indicate the temperature of the clutch. The thermal capacity of the clutch may be indicated by a thermal capacity indicator 172 such that the driver can watch the HMI 160 to determine how much and for how long the accelerator can be depressed. For example, if the temperature of the clutch is approaching the thermal capacity, the driver may choose to remove pressure from the accelerator pedal to allow the clutch to cool and thus prevent an automated end to the stall-phase through derating the clutch or otherwise. An active display, such as the temperature meter 170, therefore allows for the driver to monitor the stall start. The clutch temperature can be determined by a status monitor, which may determine other clutch properties that can be displayed on the information means.

The HMI may also comprise an options button 174 arranged to permit the driver to access an options menu for the stall-start method. Options available in the options menu may include, for example, an adjustable parameter to determine the time allowed for the stall phase. This example provides the driver with the option of foregoing maximum power in favour of longer stall periods. As discussed above, maximum power may only be held for a short period of time because of the thermal capacity of the clutch. A lower power, however, may be held for a relatively longer time. Choosing between these options may also be made in the absence of an HMI. In such examples, the stall period may be factory set.

The stall-start method as described above is not limited to the vehicle being at a stand-still before the stall-phase is initialised. For example, the stall-phase could be initialised during deceleration of the car. This may be preferable for when the driver is approaching a stop light such that on approach to the stop light the driver applies the accelerator pedal whilst braking the vehicle. In embodiments where the HMI is used to enact the stall-start method, the driver could press the stall-start button on approach to the lights such that application of the brakes by the driver brings the car to a stop at the stop light while the system and method is in the stall phase. On change of the stop light to a go light, the driver can press the accelerator to end the stall phase and initialise the start phase. These embodiments may be preferable when the driver is unaware of how long the light has shown stop and may want to be ready to accelerate as soon as possible after the light indicates that the driver can go.

The invention claimed is:

1. A method for operating a hybrid vehicle having a combustion engine connected to an electric machine connected to a first clutch connected to a drive load and a second clutch positioned between the combustion engine and the electric machine, the combustion engine configured to supply torque in a first rotation direction, the method comprising a first phase and a second phase, wherein in the first phase the method comprises:
operating the first clutch in a non-engaged condition;

operating the second clutch in an engaged configuration to transfer torque from the combustion engine to the electric machine; and operating the electric machine as a generator to apply torque in a second rotation direction opposite the first rotation direction; and wherein in the second phase the method comprises:

operating the second clutch in a non-engaged condition for a first period of time, wherein the first period of time begins substantially at the beginning of the second phase;

operating the first clutch in an engaged condition to drive the drive load;

ceasing operation of the electric machine as a generator; and operating the second clutch in an engaged configuration for a second period of time, wherein the second period of time is after the first period of time.

2. The method of claim 1, wherein in the second phase, the method further comprises operating the electric machine as a motor to apply torque in the first rotation direction.

3. The method of claim 2, wherein the electric machine is operated as a motor to apply torque in the first rotation direction during the first period of time of the second phase.

4. The method of claim 1, wherein the first clutch is operated to transition from the non-engaged configuration to the engaged configuration during the first period of time of the second phase.

5. The method of claim 1, wherein engine speed is controlled in dependence of the condition of the first and/or second clutches.

6. A control apparatus for operating a hybrid vehicle comprising a combustion engine connected to an electric machine connected to a first clutch connected to a drive load and a second clutch positioned between the combustion engine and the electric machine, the combustion engine configured to supply torque in a first rotation direction, the control apparatus comprising a controller operable in a first state and a second state, wherein in the first state, the controller:

controls the first clutch to operate in a non-engaged configuration;

controls the second clutch to operate in an engaged configuration; and controls the electric machine to operate as a generator to apply torque in a second rotation direction opposite the first rotation direction; and wherein in the second state, the controller:

controls the second clutch to operate in a non-engaged condition for a first period of time, wherein the first period of time begins substantially at entry into the second state;

controls the first clutch to operate in an engaged configuration to drive the drive load;

controls the electric machine to cease operating as a generator; and controls the second clutch to operate in an engaged configuration for a second period of time, wherein the second period of time is after the first period of time.

7. The control apparatus of claim 6, wherein, in the second state, the controller controls the electric machine to operate as a motor.

8. The control apparatus of claim 7, wherein the controller controls the electric machine to operate as a motor to apply torque in the first rotation direction during the first period of time of the second state.

9. The control apparatus of claim 6, further comprising a human-machine interface arranged to operate the controller of the control apparatus.

10. The control apparatus of claim 9, wherein the human-machine interface comprises a start control arranged to operate the controller to operate in the first state.

11. The control apparatus of claim 10, wherein the start control is arranged in the first state to operate the controller to operate in the second start state.

12. The control apparatus of claim 10, wherein the start control is a button.

13. The control apparatus of claim 6, further comprising a display and a status monitor, wherein the status monitor is arranged to monitor a status of the first clutch in the first state and control the display in dependence on the status of the first clutch.

14. The control apparatus of claim 6, further comprising a configurable countdown timer arranged to operate the controller in the first state to end the first state after a predetermined period of time.

15. A hybrid vehicle comprising the control apparatus of claim 6.

16. The control apparatus of claim 6, wherein the controller controls the first clutch to transition from the non-engaged configuration to the engaged configuration during the first period of time of the second state.

17. The control apparatus of claim 6, wherein the controller controls the engine speed in dependence of the condition of the first and/or second clutches.

* * * * *